United States Patent
Mahajan

(10) Patent No.: US 11,932,283 B2
(45) Date of Patent: Mar. 19, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Aditya Mahajan, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 17/672,737

(22) Filed: Feb. 16, 2022

(65) Prior Publication Data
US 2022/0258769 A1 Aug. 18, 2022

(30) Foreign Application Priority Data

Feb. 18, 2021 (JP) .................................. 2021-024365

(51) Int. Cl.
| | | |
|---|---|---|
| *B60W 60/00* | (2020.01) | |
| *G06V 20/56* | (2022.01) | |
| *G06V 20/58* | (2022.01) | |

(52) U.S. Cl.
CPC ......... *B60W 60/0027* (2020.02); *G06V 20/58* (2022.01); *G06V 20/588* (2022.01); *B60W 2420/403* (2013.01); *B60W 2552/53* (2020.02); *B60W 2554/4044* (2020.02); *B60W 2710/20* (2013.01); *B60W 2720/106* (2013.01)

(58) Field of Classification Search
CPC ......... B60W 60/0027; B60W 2420/42; B60W 2552/53; B60W 2554/4044; B60W 2710/20; B60W 2720/106; B60W 2554/402; B60W 30/165; B60W 60/001;
(Continued)

(56) References Cited

U.S. PATENT DOCUMENTS

| | | | | |
|---|---|---|---|---|
| 2003/0195667 A1* | 10/2003 | Tange | ................... | B60W 10/18 701/1 |
| 2008/0013789 A1* | 1/2008 | Shima | .................. | G06V 20/588 382/104 |

(Continued)

FOREIGN PATENT DOCUMENTS

| | | | |
|---|---|---|---|
| CN | 102622886 A | * | 8/2012 |
| JP | 2017-161430 | | 9/2017 |

(Continued)

*Primary Examiner* — Joseph J Dallo
(74) *Attorney, Agent, or Firm* — Amin, Turocy & Watson, LLP

(57) ABSTRACT

A vehicle control device that can appropriately recognize a direction of a vehicle is provided. The vehicle control device includes: an image acquirer configured to acquire an image obtained by imaging a space outside of a vehicle; an object detector configured to detect, through image processing, a plurality of types of objects including a road structure and a moving object shown in the image; a reference line setter configured to select one type of object from the plurality of types of objects and to set a reference line based on a direction of the selected type of object; and a vehicle direction estimator configured to estimate an angle which is formed by the reference line and a traveling direction line of the vehicle as a direction of the vehicle relative to a lane in which the vehicle is traveling or is scheduled to travel.

8 Claims, 8 Drawing Sheets

(58) Field of Classification Search
CPC .................... B60W 30/18163; G06V 20/58; G06V 20/588
See application file for complete search history.

(56) References Cited

U.S. PATENT DOCUMENTS

2011/0234749 A1* 9/2011 Alon .................. G08G 1/054
  348/148
2017/0123293 A1* 5/2017 Yuen .................. G03B 11/045

FOREIGN PATENT DOCUMENTS

| | | | | |
|---|---|---|---|---|
| WO | WO-02056276 A2 * | 7/2002 | ............... | G08G 1/00 |
| WO | WO-2005005206 A1 * | 1/2005 | ........... | B60R 21/013 |
| WO | WO-2005080119 A1 * | 9/2005 | ........... | B60R 21/013 |
| WO | WO-2005119594 A2 * | 12/2005 | ........ | G06K 9/00798 |
| WO | WO-2006080547 A1 * | 8/2006 | ............ | G01C 21/26 |
| WO | WO-2009045096 A1 * | 4/2009 | ............ | G01C 21/32 |
| WO | WO-2010032532 A1 * | 3/2010 | ........... | B60W 30/14 |
| WO | WO-2014145319 A1 * | 9/2014 | ............ | G01C 11/02 |
| WO | WO-2015178542 A1 * | 11/2015 | ............ | H04N 5/225 |
| WO | WO-2017134897 A1 * | 8/2017 | ........ | G06K 9/00718 |
| WO | WO-2020087322 A1 * | 5/2020 | | |
| WO | WO-2021198772 A1 * | 10/2021 | ........... | B60W 30/12 |
| WO | WO-2021226027 A1 * | 11/2021 | ........... | G01S 17/931 |

\* cited by examiner

FIG. 3A
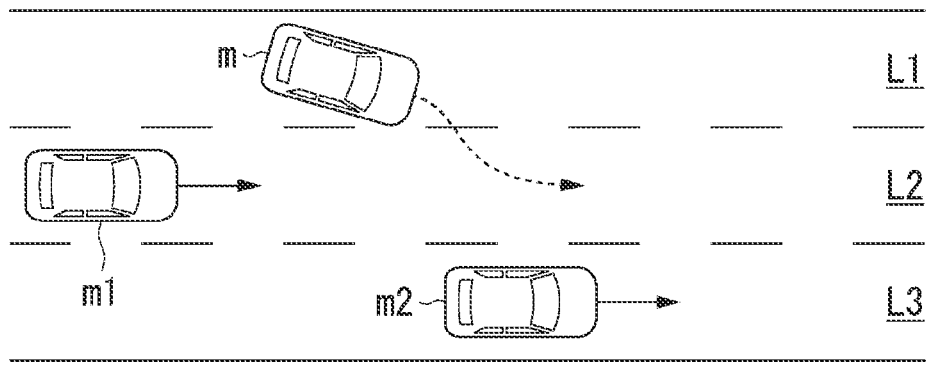
FIG. 3B
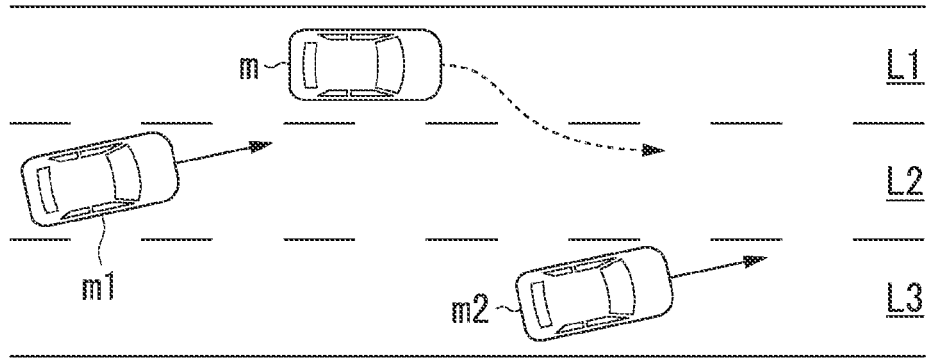
FIG. 4
| PRIORITY | OBJECT |
|---|---|
| 1 | BOUNDARY LINE, GUARD RAIL, AND WALL OF HOST LANE |
| 2 | BOUNDARY LINE, GUARD RAIL, AND WALL OF ADJACENT LANE |
| 3 | ANOTHER VEHICLE IN ADJACENT LANE |

VEHICLE CONTROL DEVICE, VEHICLE CONTROL METHOD, AND STORAGE MEDIUM

CROSS-REFERENCE TO RELATED APPLICATION

The application is based on Japanese Patent Application No. 2021-024365 filed on Feb. 18, 2021, the content of which incorporated herein by reference.

BACKGROUND OF THE INVENTION

Field of the Invention

The present invention relates to a vehicle control device, a vehicle control method, and a storage medium.

Description of Related Art

A technique of detecting information of another vehicle relative to a host vehicle is known. For example, Japanese Unexamined Patent Application, First Publication No. 2017-161430 discloses a technique of detecting a relative position of another vehicle based on a radio signal which is transmitted from the other vehicle.

SUMMARY OF THE INVENTION

However, when only relative information such as a relative position of another vehicle is used, for example, a direction of a host vehicle may not be appropriately recognized at the time of lane change of the host vehicle.

The invention has been made in view of the above-mentioned circumstances and an objective thereof is to provide a vehicle control device, a vehicle control method, and a storage medium storing a program that can appropriately recognize a direction of a vehicle.

A vehicle control device according to the invention employs the following configurations.

(1) According to an aspect of the invention, there is provided a vehicle control device including: an image acquirer configured to acquire an image obtained by imaging a space outside of a vehicle; an object detector configured to detect, through image processing, a plurality of types of objects including a road structure and a moving object shown in the image; a reference line setter configured to select one type of object from the plurality of types of objects and to set a reference line based on a direction of the selected type of object; and a vehicle direction estimator configured to estimate an angle which is formed by the reference line and a traveling direction line of the vehicle as a direction of the vehicle relative to a lane in which the vehicle is traveling or is scheduled to travel.

(2) In the aspect of (1), when the selected type of object is the road structure, the direction of the selected type of object is an extending direction of the road structure, or when the selected type of object is the moving object, the direction of the selected type of object is a traveling direction of the moving object.

(3) In the aspect of (1), the reference line setter may select one type of object from among the detected plurality of types of objects based on a predetermined priority.

(4) In the aspect of (3), in the predetermined priority, a boundary line of the lane in which the vehicle is traveling or is scheduled to travel may have the highest priority, a boundary line of an adjacent lane of the lane may have the second highest priority, and another vehicle near the vehicle may have the third highest priority.

(5) In the aspect of (1), the vehicle control device may further include a driving controller configured to generate a target trajectory based on the direction of the vehicle estimated by the vehicle direction estimator and to control steering and acceleration/deceleration of the vehicle regardless of operation of a driver of the vehicle such that the vehicle travels along the generated target trajectory.

(6) According to another aspect of the invention, there is provided a vehicle control method which is performed by a computer mounted on a vehicle, the vehicle control method including: acquiring an image obtained by imaging a space outside of a vehicle; detecting, through image processing, a plurality of types of objects including a road structure and a moving object shown in the image; selecting one type of object from the plurality of types of objects and setting a reference line based on a direction of the selected type of object; and estimating an angle which is formed by the reference line and a traveling direction line of the vehicle as a direction of the vehicle relative to a lane in which the vehicle is traveling or is scheduled to travel.

(7) According to another aspect of the invention, there is provided a computer-readable non-transitory storage medium storing a program for causing a computer mounted on a vehicle to: acquire an image obtained by imaging a space outside of a vehicle; detect, through image processing, a plurality of types of objects including a road structure and a moving object shown in the image; select one type of object from the plurality of types of objects and set a reference line based on a direction of the selected type of object; and estimate an angle which is formed by the reference line and a traveling direction line of the vehicle as a direction of the vehicle relative to a lane in which the vehicle is traveling or is scheduled to travel.

According to the aspects of (1) to (7), it is possible to appropriately recognize a direction of a vehicle.

According to the aspect of (5), it is possible to appropriately control the vehicle based on the recognized direction of the vehicle.

BRIEF DESCRIPTION OF THE DRAWINGS

FIGS. 3A and 3B are diagrams illustrating an example of travel control of a vehicle according to a comparative example;

FIG. 4 is a diagram illustrating an example of a priority with which a reference line setter selects an object;

DETAILED DESCRIPTION OF THE INVENTION

Hereinafter, a vehicle control device, a vehicle control method, and a storage medium according to an embodiment of the invention will be described with reference to the accompanying drawings.

Overall Configuration

Figure 1:
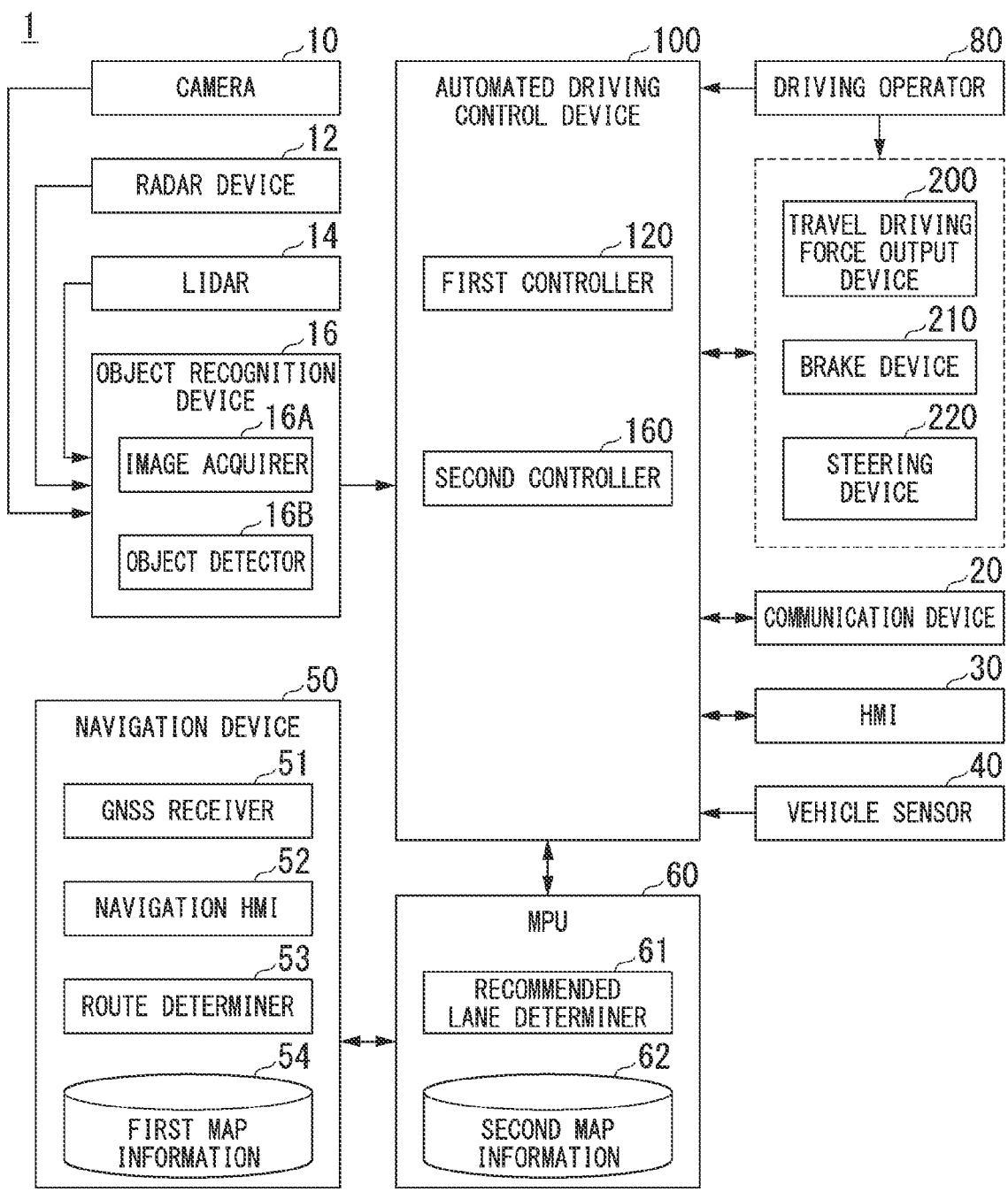
FIG. 1 is a diagram illustrating a configuration of a vehicle system including a vehicle control device according to an embodiment.

FIG. 1 is a diagram illustrating a configuration of a vehicle system 1 including a vehicle control device according to an embodiment. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to the internal combustion engine or electric power which is discharged from a secondary battery or a fuel cell.

The vehicle system 1 includes, for example, a camera 10, a radar device 12, a Light Detection and Ranging device (LIDAR) 14, an object recognition device 16, a communication device 20, a human-machine interface (HMI) 30, a vehicle sensor 40, a navigation device 50, a map positioner (MPU) 60, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto.

The camera 10 is, for example, a digital camera using a solid-state imaging device such as a charge coupled device (CCD) or a complementary metal oxide semiconductor (CMOS). The camera 10 is attached to an arbitrary position on a vehicle (hereinafter, referred to as a host vehicle M) in which the vehicle system 1 is mounted. For example, when the front view of the vehicle M is imaged, the camera 10 is attached to an upper part of a front windshield, a rear surface of a rearview mirror, or the like. The camera 10 images surroundings of the host vehicle M, for example, periodically and repeatedly. The camera 10 may be a stereoscopic camera.

The radar device 12 radiates radio waves such as millimeter waves to the surroundings of the host vehicle M, detects radio waves (reflected waves) reflected by an object, and detects at least a position (a distance and a direction) of the object. The radar device 12 is attached to an arbitrary position on the host vehicle M. The radar device 12 may detect a position and a speed of an object using a frequency modulated continuous wave (FM-CW) method.

The LIDAR 14 applies light to the surroundings of the host vehicle M and measures scattered light. The LIDAR 14 detects a distance to an object based on a time from emission of light to reception of light. The light which is applied is, for example, a pulse-like laser beam. The LIDAR 14 is attached to an arbitrary position on the host vehicle M.

The object recognition device 16 performs a sensor fusion process on results of detection from some or all of the camera 10, the radar device 12, and the LIDAR 14 and recognizes a position, a type, a speed, and the like of an object. The object recognition device 16 outputs the result of recognition to the automated driving control device 100. The object recognition device 16 may output the results of detection from the camera 10, the radar device 12, and the LIDAR 14 to the automated driving control device 100 without any change. The object recognition device 16 may be omitted from the vehicle system 1. In this embodiment, the object recognition device 16 includes an image acquirer 16A and an object detector 16B. The image acquirer 16A acquires an image of a space outside of the vehicle which is captured by the camera 10. The object detector 16B detects, through image processing, a plurality of types of objects including a road structure and a moving object shown in the image.

The communication device 20 communicates with other vehicles near the host vehicle M, for example, using a cellular network, a Wi-Fi network, Bluetooth (registered trademark), or dedicated short range communication (DSRC) or communicates with various server devices via a radio base station.

The HMI 30 presents various types of information to an occupant of the host vehicle M and receives an input operation from the occupant. The HMI 30 includes various display devices, speakers, buzzers, a touch panel, switches, and keys.

The vehicle sensor 40 includes a vehicle speed sensor that detects a speed of the host vehicle M, an acceleration sensor that detects acceleration, a yaw rate sensor that detects an angular velocity around a vertical axis, and a direction sensor that detects a direction of the host vehicle M.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M based on signals received from GNSS satellites. The position of the host vehicle M may be identified or complemented by an inertial navigation system (INS) using the output of the vehicle sensor 40. The navigation HMI 52 includes a display device, a speaker, a touch panel, and keys. A whole or a part of the navigation HMI 52 may be shared by the HMI 30. For example, the route determiner 53 determines a route (hereinafter, referred to as a route on a map) from the position of the host vehicle M identified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include a curvature of a road or point of interest (POI) information. The route on a map is output to the MPU 60. The navigation device 50 may perform guidance for a route using the navigation HMI 52 based on the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The MPU 60 includes, for example, a recommended lane determiner 61 and stores second map information 62 in a storage device such as an HDD or a flash memory. The recommended lane determiner 61 divides a route on a map supplied from the navigation device 50 into a plurality of blocks (for example, every 100 [m] in a vehicle travel direction) and determines a recommended lane for each block with reference to the second map information 62. The recommended lane determiner 61 determines in which lane from the leftmost the host vehicle is to travel. When there is a branching point in the route on a map, the recommended lane determiner 61 determines a recommended lane such that the host vehicle M travels on a rational route for traveling to a branching destination.

The second map information 62 is map information with higher precision than that of the first map information 54. The second map information 62 includes, for example, information on the centers of lanes or information on boundaries of lanes. The second map information 62 may include road information, traffic regulation information, address information (addresses and postal codes), facility information, and phone number information. The second map information 62 may be updated from time to time by causing the communication device 20 to communicate with another device.

The driving operator 80 includes, for example, an accelerator pedal, a brake pedal, a shift lever, a steering wheel, a deformed steering wheel, a joystick, and other operators. A sensor that detects an amount of operation or performing of an operation is attached to the driving operator 80, and results of detection thereof are output to the automated driving control device 100 or some or all of the travel driving force output device 200, the brake device 210, and the steering device 220.

The automated driving control device 100 includes, for example, a first controller 120 and a second controller 160. The first controller 120 and the second controller 160 are realized, for example, by causing a hardware processor such as a central processor (CPU) to execute a program (software). Some or all of such elements may be realized in hardware (which includes circuitry) such as a large scale integration (LSI), an application specific integrated circuit (ASIC), or a field-programmable gate array (FPGA), or a graphics processor (GPU) or may be realized in cooperation of software and hardware. The program may be stored in a storage device (a storage device including a non-transitory storage medium) such as an HDD or a flash memory of the automated driving control device 100 in advance, or may be installed in the HDD or the flash memory of the automated driving control device 100 by storing the program in a removable storage medium (a non-transitory storage medium) such as a DVD or a CD-ROM and attaching the removable storage medium to a drive device. A combination of the object recognition device 16 and the automated driving control device 100 are an example of a "vehicle control device," and a combination of a movement plan creator 140 and the second controller 160 are an example of a "driving controller."

Figure 2:
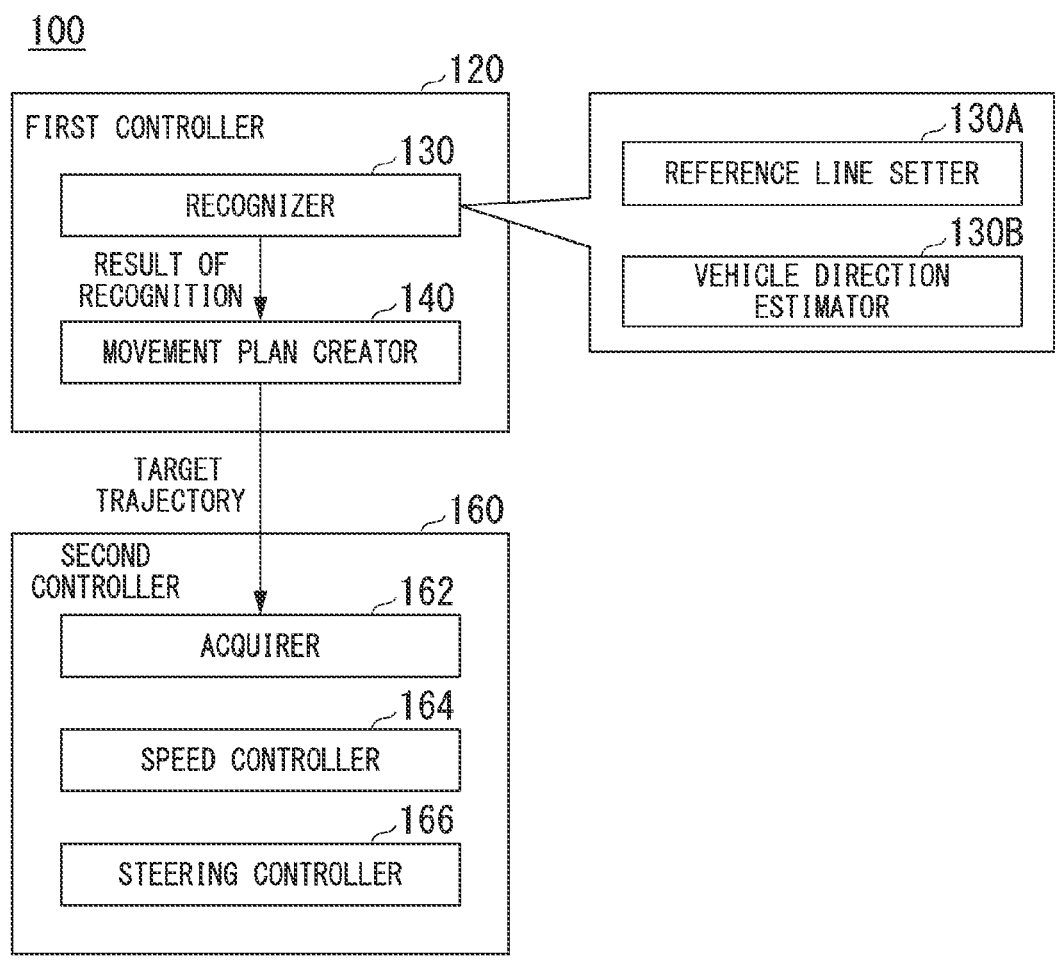
FIG. 2 is a diagram illustrating functional configurations of a first controller and a second controller.

FIG. 2 is a diagram illustrating functional configurations of the first controller 120 and the second controller 160. The first controller 120 includes, for example, a recognizer 130 and a movement plan creator 140. The first controller 120 is realized, for example, using a function based on artificial intelligence (AI) and a function based on a predetermined model together. For example, a function of "recognizing a crossing" may be embodied by performing recognition of a crossing based on deep learning or the like and recognition based on predetermined conditions (such as signals and road signs which can be pattern-matched), scoring both recognitions, and comprehensively evaluating both recognitions. Accordingly, reliability of automated driving is secured.

The recognizer 130 recognizes states such as a position, a speed, and an acceleration of an object near the host vehicle M based on information input from the camera 10, the radar device 12, and the LIDAR 14 via the object recognition device 16. For example, a position of an object is recognized as a position in an absolute coordinate system with an origin set to a representative point of the host vehicle M (such as the center of gravity or the center of a drive shaft) and is used for control. A position of an object may be expressed as a representative point such as the center of gravity or a corner of the object or may be expressed as a drawn area. A "state" of an object may include an acceleration or a jerk of the object or a "moving state" (for example, whether lane change is being performed or whether lane change is going to be performed) thereof.

The recognizer 130 recognizes, for example, a lane (a travel lane) in which the host vehicle M is traveling. For example, the recognizer 130 recognizes the travel lane by comparing a pattern of road marking lines (hereinafter referred to as boundary lines) near the host vehicle M which are recognized from an image captured by the camera 10 with a pattern of boundary lines (for example, arrangement of a solid line and a dotted line) which are acquired from the second map information 62. The recognizer 130 is not limited to the boundary lines, but may recognize the travel lane by recognizing travel road boundaries (road boundaries) including boundary lines, edges of roadsides, curbstones, medians, and guard rails. In this recognition, the position of the host vehicle M acquired from the navigation device 50 and the result of processing from the INS may be considered. The recognizer 130 recognizes a stop line, an obstacle, a red signal, a toll gate, or other road events.

The recognizer 130 further includes a reference line setter 130A and a vehicle direction estimator 130B, and estimates the direction of the host vehicle M with respect to the reference line set by the reference line setter 130A. Details of the functions of the reference line setter 130A and the vehicle direction estimator 130B will be described later.

The movement plan creator 140 creates a target trajectory in which the host vehicle M will travel autonomously (without requiring a driver's operation) in the future such that the host vehicle M travels in a recommended lane determined by the recommended lane determiner 61 in principle and copes with surrounding circumstances of the host vehicle M based on the direction of the host vehicle estimated by the vehicle direction estimator 130B. A target trajectory includes, for example, a speed element. For example, a target trajectory is expressed by sequentially arranging points (trajectory points) at which the host vehicle M is to arrive. Trajectory points are points at which the host vehicle M is to arrive at intervals of a predetermined traveling distance (for example, about several [m]) along a road, and a target speed and a target acceleration at intervals of a predetermined sampling time (for example, about below the decimal point [sec]) are created as a part of a target trajectory in addition. Trajectory points may be positions at which the host vehicle M is to arrive at sampling times every predetermined sampling time. In this case, information of a target speed or target acceleration is expressed by intervals between the trajectory points.

The movement plan creator 140 may set events of automated driving in creating a target trajectory. The events of automated driving include a constant-speed travel event, a low-speed following travel event, a lane change event, a branching event, a merging event, and a take-over event. The movement plan creator 140 creates a target trajectory based on events which are started.

The second controller 160 controls the travel driving force output device 200, the brake device 210, and the steering device 220 such that the host vehicle M travels along a target trajectory created by the movement plan creator 140 as scheduled.

Referring to FIG. 2, the second controller 160 includes, for example, an acquirer 162, a speed controller 164, and a steering controller 166. The acquirer 162 acquires information of a target trajectory (trajectory points) created by the movement plan creator 140 and stores the acquired information in a memory (not illustrated). The speed controller 164 controls the travel driving force output device 200 or the brake device 210 based on a speed element accessory to the target trajectory stored in the memory. The steering controller 166 controls the steering device 220 based on a curve state of the target trajectory stored in the memory. The processes of the speed controller 164 and the steering controller 166 are realized, for example, in combination of feed-forward control and feedback control. For example, the steering controller 166 performs control in combination of feed-forward control based on a curvature of a road in front of the host vehicle M and feedback control based on separation from the target trajectory.

The travel driving force output device 200 outputs a travel driving force (a torque) for allowing the vehicle to travel to the driving wheels. The travel driving force output device 200 includes, for example, a combination of an internal combustion engine, an electric motor, and a transmission and an ECU that controls them. The ECU controls the elements based on information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor based on the information input from the second controller 160 or the information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator based on information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor based on the information input from the second controller 160 or the information input from the driving operator 80 to change the direction of the turning wheels.

COMPARATIVE EXAMPLES

A comparative example will be described below with reference to FIGS. 3A and 3B. FIGS. 3A and 3B are diagrams illustrating an example of traveling control of a vehicle m according to a comparative example. The vehicle m has an automated driving function and does not include at least the reference line setter 130A and the vehicle direction estimator 130B illustrated in FIG. 2. In FIGS. 3A and 3B, the vehicle m is traveling in a lane L1 and is scheduled to perform lane change to a lane L2. Since vehicles m1 and m2 which are neighboring vehicles of the vehicle m are traveling straight ahead in lanes L2 and L3, respectively, the vehicle m can perform lane change without any problems by maintaining or increasing a speed at the time of lane change to the lane L2.

On the other hand, in FIG. 3B, the vehicle m is traveling in the lane L1 and is scheduled to perform lane change to the lane L2. At this time, relative positional relationship between the vehicle m and the vehicles m1 and m2 are similar to those in FIG. 3A. However, in FIG. 3B, the vehicles m1 and m2 are traveling in directions in which they will depart from the lanes L2 and L3, respectively, and thus, particularly, lane change of the vehicle m to the lane L2 may cause a problem with the vehicle m2. That is, it may not be appropriate to control the vehicle m based on only the relative positional relationships between the vehicle m and the vehicles m1 and m2.

Between FIG. 3A and FIG. 3B, the relative positional relationships between the vehicle m and the vehicles m1 and m2 are similar to each other, but an angle which is formed by the traveling direction of the vehicle m and a boundary line of the lane L1 in which the vehicle m is traveling is different. Specifically, in FIG. 3A, an angle which is formed by the traveling direction of the vehicle m and an extending direction of the boundary line of the lane L1, that is, the direction of the vehicle m, has a positive value. In FIG. 3B, the direction of the vehicle m is substantially zero. Accordingly, in the situation illustrated in FIG. 3B, since the direction of the vehicle m is substantially zero, another vehicle instead of the vehicle m is traveling in a direction in which it will depart from a lane and may cause a problem in lane change of the vehicle m. On the other hand, the host vehicle M according to this embodiment can set a reference line and estimate the direction of the host vehicle M with respect to the reference line, whereby it is possible to more appropriately control traveling of the host vehicle M. Details thereof will be described below.

Setting of reference line and estimation of direction of host vehicle M

The reference line setter 130A selects one type of object based on a predetermined priority from a plurality of types of objects recognized by the object recognition device 16 and sets a virtual reference line RL (which corresponds to the "extending direction of the boundary line") corresponding to a direction of the selected type of object. At this time, the objects recognized by the object recognition device 16 are expressed in a camera coordinate system with an origin set to the camera 10, and the reference line setter 130A converts the coordinates in the camera coordinate system to coordinates on an assumed plane which is expressed as a two-dimensional plane when the surrounding space of the host vehicle M is seen from the sky and then sets the reference line RL.

The vehicle direction estimator 130B estimates an angle which is formed by the set reference line RL and a traveling direction line of the host vehicle M (which corresponds to the "traveling direction of the vehicle m") as the direction of the host vehicle M with respect to a lane in which the host vehicle M is traveling or is scheduled to travel. In this embodiment, the traveling direction line is a central axis of the host vehicle M, or may be substantially, for example, an instantaneous moving direction of the host vehicle M, that is, the actual traveling direction of the host vehicle M.

FIG. 4 is a diagram illustrating an example of a priority with which the reference line setter 130A selects an object. As illustrated in FIG. 4, a boundary line, a guard rail, and a wall of a host lane are set to Priority 1 indicating the highest priority. The boundary line, the guard rail, and the wall of the host lane may be those of a lane in which the host vehicle M is traveling or those in a lane in which the host vehicle M is scheduled to travel. For example, immediately before the host vehicle M performs lane change or while the host vehicle M is performing lane change, a boundary line, a guard rail, or a wall of a lane which is a change destination may be selected as an object instead of the boundary line, the guard rail, or the wall of the lane in which the host vehicle is traveling. When two or more types of objects out of the boundary line, the guard rail, and the wall of the host lane are recognized by the object recognition device 16, the reference line setter 130A can select one type of object using an arbitrary method and, for example, may select an object closest to the host vehicle M. Some or all of the boundary line, the guard rail, and the wall are an example of a "road structure."

A boundary line, a guard rail, and a wall of an adjacent lane are set to Priority 2 indicating the second highest priority. That is, when the boundary line, the guard rail, and the wall of the host lane are not included in the objects recognized by the object recognition device 16, the reference line setter 130A selects the boundary line, the guard rail, or the wall of the adjacent lane as an object. When two or more types of objects out of the boundary line, the guard rail, and the wall of the adjacent lane are recognized by the object recognition device 16, the reference line setter 130A can select one type of object using an arbitrary method and, for example, may select an object closest to the host vehicle M.

Another vehicle in an adjacent lane is set to Priority 3 indicating the third highest priority. That is, when the boundary lines, the guard rails, and the walls of the host lane and the adjacent lane are not included in the objects recognized by the object recognition device 16, the reference line setter 130A selects another vehicle in the adjacent lane as an object. Here, when two or more vehicles in the adjacent lane are recognized, the reference line setter 130A selects the two or more vehicles as objects. Another vehicle in an adjacent lane is an example of a "moving object."

In this way, the reference line setter 130A selects one type of object based on the priority illustrated in FIG. 4, and sets the reference line RL corresponding to the direction of the selected type of object. Here, a "direction of an object" indicates an extending direction when the object is a boundary line, a guard rail, or a wall, and indicates a moving direction of another vehicle when the object is another vehicle in an adjacent lane. In this case, the moving direction may be a central axis of another vehicle or may be an estimated moving direction of another vehicle. When two or more objects of one type are selected or when two or more vehicles in an adjacent lane are selected, the reference line setter 130A sets the reference line RL corresponding to an average direction of the two or more objects.

Situation Examples

Figure 5:
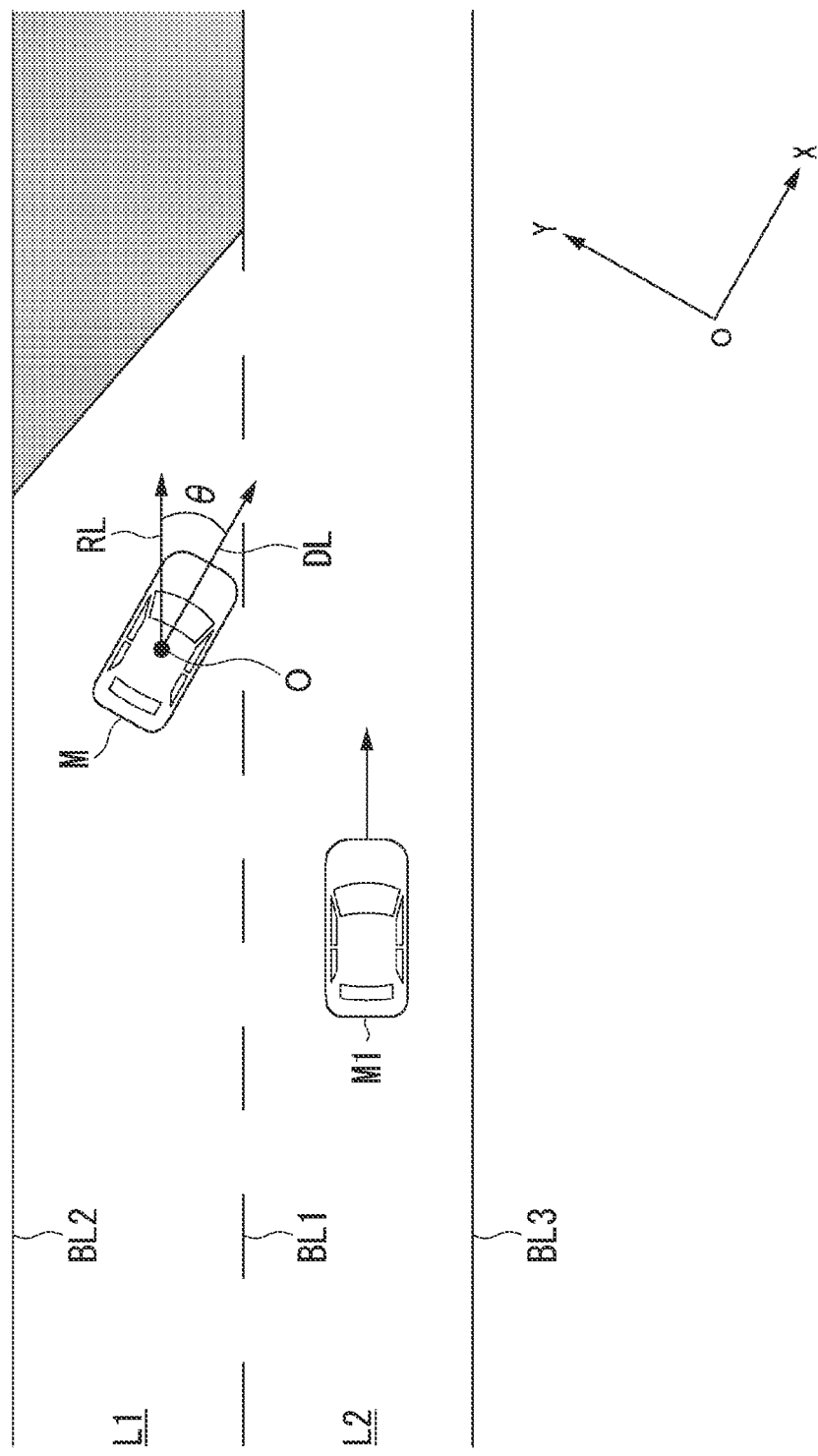
FIG. 5 is a diagram illustrating an example of a first situation in which setting of a reference line RL and estimation of a direction of a host vehicle M are performed.

Examples of situations in which setting of a reference line RL and estimation of a direction of a host vehicle M are performed will be described below with reference to FIGS. 5 to 8. FIG. 5 is a diagram illustrating an example of a first situation in which setting of the reference line RL and estimation of the direction of the host vehicle M are performed. In FIG. 5, the host vehicle M is traveling in a lane L1 and is going to perform lane change to a lane L2 due to a decrease in the number of lanes. In this situation, the camera 10 acquires an image of a boundary line BL1 and a boundary line BL2 of the lane L1, a boundary line BL3 of the lane L2, and another vehicle M1, and the object recognition device 16 detects the boundary line BL1, the boundary line BL2, the boundary line BL3, and the other vehicle M1 as objects through image processing. Then, the reference line setter 130A selects the boundary line BL1 and the boundary line BL2 with Priority 1 as objects based on the priority illustrated in FIG. 4, and sets a reference line RL corresponding to an average direction of the boundary line BL1 and the boundary line BL2. Then, the vehicle direction estimator 130B estimates an angle θ which is formed by the set reference line RL and the traveling direction line of the host vehicle M as the direction of the host vehicle M with respect to the lane L1. Then, the movement plan creator 140 creates a target trajectory of the host vehicle M based on the direction of the host vehicle estimated by the vehicle direction estimator 130B, and the second controller 160 controls steering and acceleration/deceleration of the host vehicle M regardless of operation by a driver of the host vehicle M such that the host vehicle M travels along the created target trajectory.

In the example of the first situation, the reference line setter 130A selects the boundary line BL1 and the boundary line BL2 with Priority 1 as objects and sets the reference line RL corresponding to the average direction thereof, and the reference line setter 130A may select one thereof as an object and set the reference line RL corresponding to the direction thereof. For example, the boundary line closer to the host vehicle M out of the boundary line BL1 and the boundary line BL2 may be selected as an object. The reference line setter 130A may recognize the lane L2 which is a lane after lane change instead of the boundary line of the lane L1 which is a lane before lane change as a lane in which the host vehicle M is scheduled to travel, and select the boundary line BL2 thereof as an object.

Figure 6:
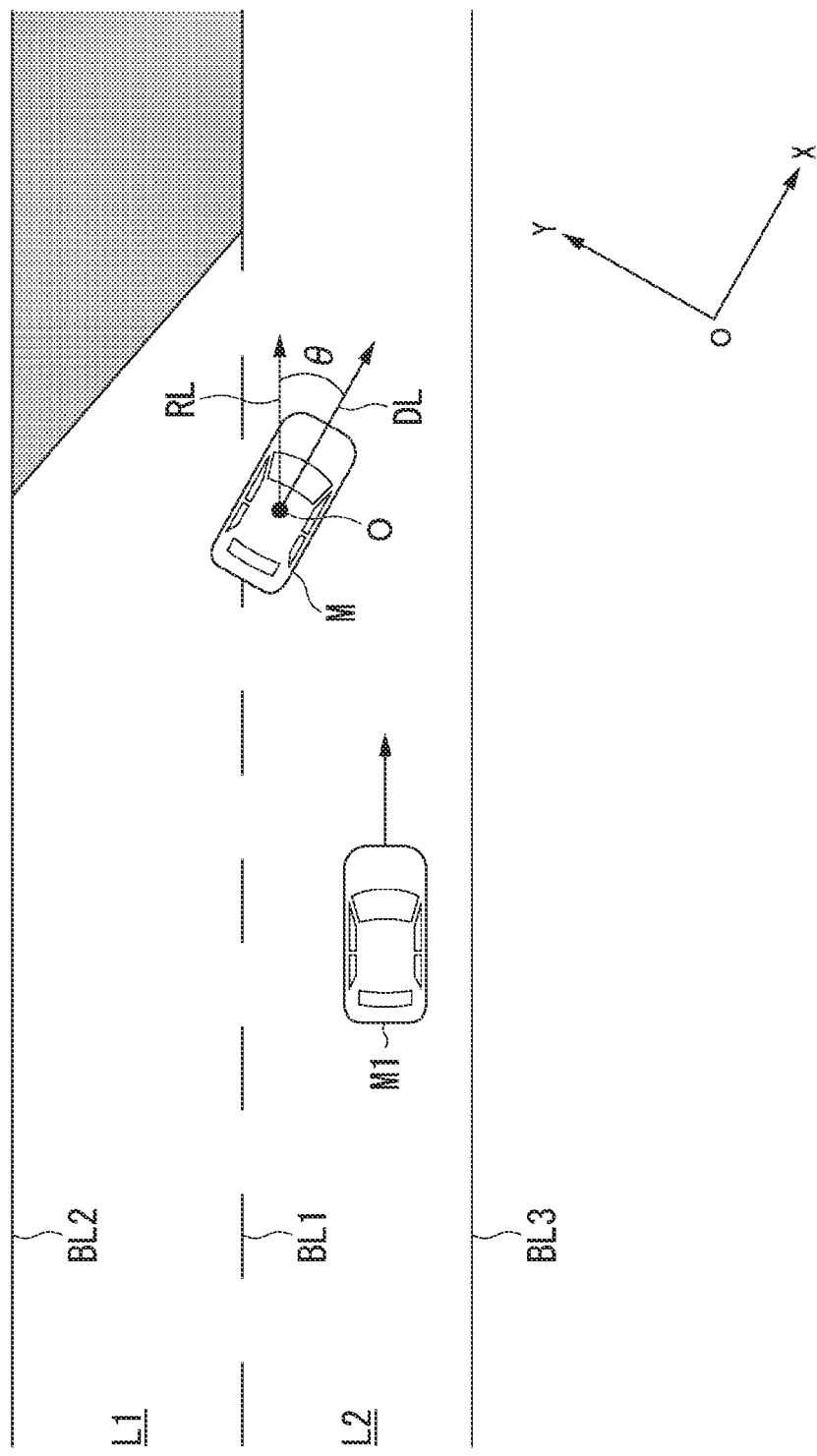
FIG. 6 is a diagram illustrating an example of a second situation in which setting of a reference line RL and estimation of a direction of a host vehicle M are performed.

FIG. 6 is a diagram illustrating an example of a second situation in which setting of the reference line RL and estimation of the direction of the host vehicle M are performed. In FIG. 6, the host vehicle M is performing lane change from the lane L1 to the lane L2 and is entering the lane L2. In this situation, the camera 10 acquires an image of the boundary line BL1 and the boundary line BL3 of the lane L2, the boundary line BL2 of the lane L1, and another vehicle M1, and the object recognition device 16 detects the boundary line BL1, the boundary line BL3, the boundary line BL2, and the other vehicle M1 as objects through image processing. Then, the reference line setter 130A selects the boundary line BL1 and the boundary line BL3 with Priority 1 as objects based on the priority illustrated in FIG. 4, and sets the reference line RL corresponding to an average direction of the boundary line BL1 and the boundary line BL3. Then, the vehicle direction estimator 130B estimates an angle θ which is formed by the set reference line RL and the traveling direction line of the host vehicle M as the direction of the host vehicle M with respect to the lane L2. Then, the movement plan creator 140 creates a target trajectory of the host vehicle M based on the direction of the host vehicle estimated by the vehicle direction estimator 130B, and the second controller 160 controls steering and acceleration/deceleration of the host vehicle M regardless of operation by a driver of the host vehicle M such that the host vehicle M travels along the created target trajectory. Similarly to the situation illustrated in FIG. 5, the reference line setter 130A may select one of the boundary line BL1 and the boundary line BL3 as an object and set the reference line RL corresponding to the direction thereof.

Figure 7:
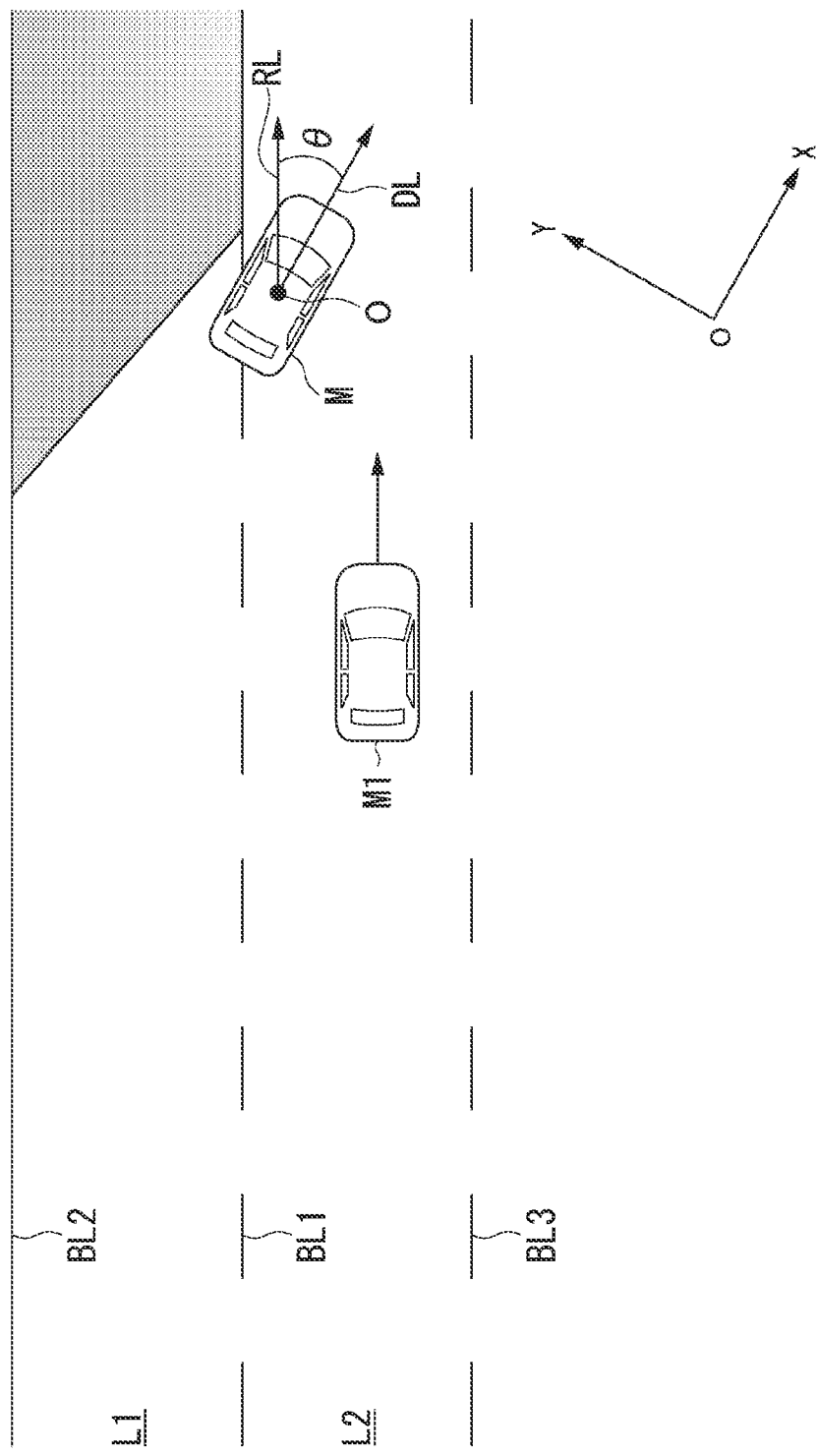
FIG. 7 is a diagram illustrating an example of a third situation in which setting of a reference line RL and estimation of a direction of a host vehicle M are performed.

FIG. 7 is a diagram illustrating an example of a third situation in which setting of the reference line RL and estimation of the direction of the host vehicle M are performed. In FIG. 7, the host vehicle M is performing lane change from the lane L1 to the lane L2. In this situation, the camera 10 acquires an image of the boundary line BL3 of the lane L2 and another vehicle M1. In this case, since the boundary line BL3 is thin and is intermittently formed, the object recognition device 16 may not detect the boundary line BL3 as an object through image processing. Even when the object recognition device 16 detects the boundary line BL3 as an object, the intermittent boundary line may have low accuracy as the reference line. Therefore, the reference line setter 130A selects the other vehicle with Priority 3 as an object based on the priority illustrated in FIG. 4, and sets the reference line RL corresponding to the direction of the other vehicle M1. Then, the vehicle direction estimator 130B estimates an angle θ which is formed by the set reference line RL and the traveling direction line of the host vehicle M as the direction of the host vehicle M with respect to the lane L2. Then, the movement plan creator 140 creates a target trajectory of the host vehicle M based on the direction of the host vehicle estimated by the vehicle direction estimator 130B, and the second controller 160 controls steering and acceleration/deceleration of the host vehicle M regardless of operation by a driver of the host vehicle M such that the host vehicle M travels along the created target trajectory.

Figure 8:
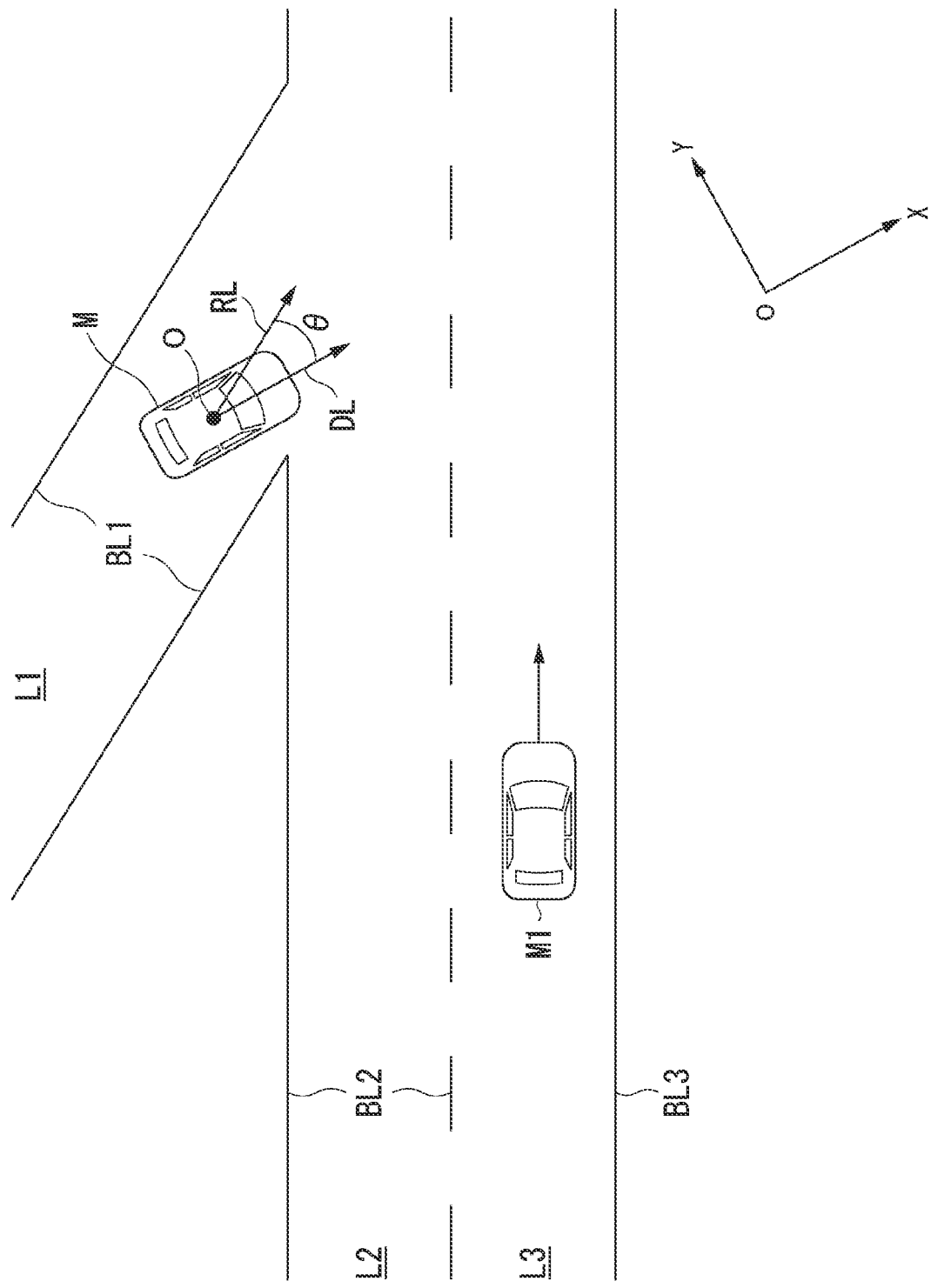
FIG. 8 is a diagram illustrating an example of a fourth situation in which setting of a reference line RL and estimation of a direction of a host vehicle M are performed.

FIG. 8 is a diagram illustrating an example of a fourth situation in which setting of the reference line RL and estimation of the direction of the host vehicle M are performed. In FIG. 8, the host vehicle M is traveling in the lane L1 and is going to merge with the lane L2. In this situation, the camera 10 acquires an image of the boundary line BL1 of the lane L1, the boundary line BL2 of the lane L2, a boundary line BL3 of a lane L3, and another vehicle M1, and the object recognition device 16 detects the boundary line BL1, the boundary line BL2, the boundary line BL3, and the other vehicle M1 as objects through image processing. Then, the reference line setter 130A selects the boundary line BL1 with Priority 1 as an object based on the priority illustrated in FIG. 4, and sets a reference line RL corresponding to an average direction of the boundary line BL1. Then, the vehicle direction estimator 130B estimates an angle θ which is formed by the set reference line RL and the traveling direction line of the host vehicle M as the direction of the host vehicle M with respect to the lane L1. Then, the movement plan creator 140 creates a target trajectory of the host vehicle M based on the direction of the host vehicle estimated by the vehicle direction estimator 130B, and the second controller 160 controls steering and acceleration/deceleration of the host vehicle M regardless of operation by a driver of the host vehicle M such that the host vehicle M travels along the created target trajectory. Similarly to the example illustrated in FIG. 5, the reference line setter 130A may recognize the lane L2 which is a lane after merging instead of the boundary line of the lane L1 which is a lane before merging as a lane in which the host vehicle M is scheduled to travel, and select the boundary line BL2 thereof as an object.

Flow of Operations

Figure 9:
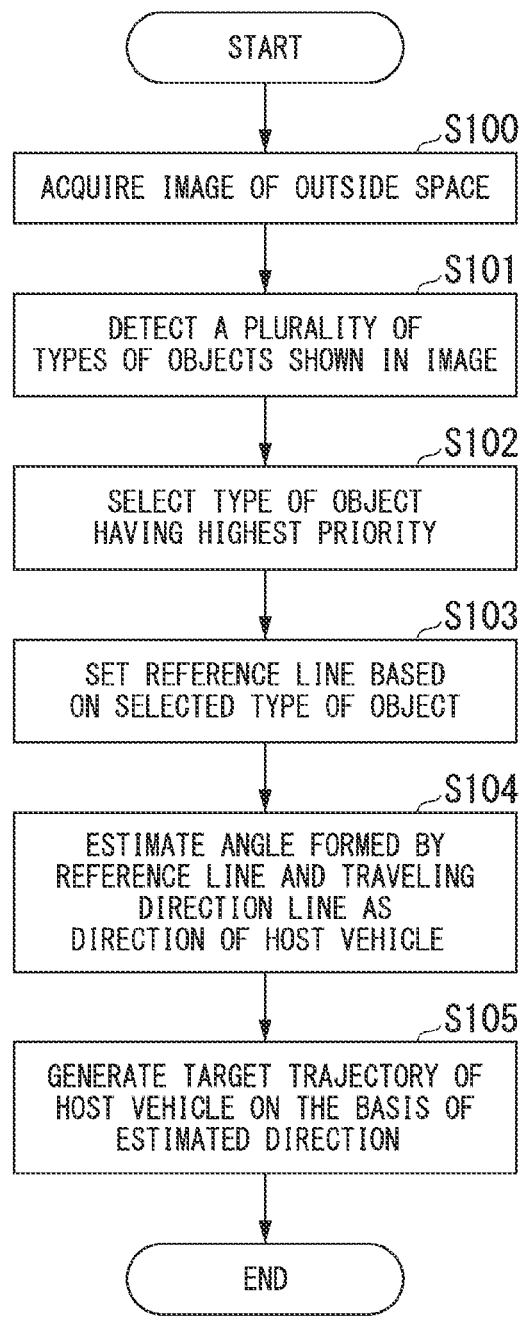
FIG. 9 is a flowchart illustrating an example of a flow of processes which are performed in cooperation by a camera, an object recognition device, and an automated driving control device.

A flow of processes which are performed in cooperation by the camera 10, the object recognition device 16, and the automated driving control device 100 will be described below with reference to FIG. 9. FIG. 9 is a flowchart illustrating an example of a flow of processes which are performed in cooperation by the camera 10, the object recognition device 16, and the automated driving control device 100. The flow of processes of the flowchart is repeatedly performed at intervals of a predetermined control cycle while the host vehicle M is traveling.

First, the camera 10 acquires an image obtained by imaging a space outside of the host vehicle M (S100). Then, the object recognition device 16 detects, through image processing, a plurality of types of objects including a road structure and a moving object shown in the image acquired by the camera 10 (S101). Then, the reference line setter 130A of the automated driving control device 100 selects one type of object from the detected plurality of types of objects based on the priority illustrated in FIG. 4 (S102). Then, the reference line setter 130A of the automated driving control device 100 sets a reference line corresponding to a direction of the selected type of object (S103). Then, the vehicle direction estimator 130B of the automated driving control device 100 estimates an angle which is formed by the set reference line and the traveling direction line of the host vehicle M as the direction of the host vehicle M with respect to a lane in which the host vehicle M is traveling or is scheduled to travel (S104). Then, the driving controller of the automated driving control device 100 generates a target trajectory based on the direction of the vehicle estimated by the vehicle direction estimator 130B and controls steering and acceleration/deceleration of the host vehicle M regardless of operation of a driver of the host vehicle M such that the host vehicle travels along the generated target trajectory (S105). Accordingly, the flow of processes of the flowchart ends.

As described above, according to this embodiment, objects included in an image acquired by the camera 10 are detected, one type of object is selected from among the detected objects based on a predetermined priority, a reference line corresponding to the direction of the selected object is set, and an angle which is formed by the set reference line and the traveling direction line of the host vehicle M is estimated as the direction of the host vehicle M. Accordingly, it is possible to appropriately recognize a direction of a vehicle.

The above-mentioned embodiment can be expressed as follows:

A vehicle control device including:

a storage device that stores a program; and a hardware processor, wherein the hardware processor is configured to execute the program stored in the storage device to:

acquire an image obtained by imaging a space outside of a vehicle;

detect, through image processing, a plurality of types of objects including a road structure and a moving object shown in the image;

select one type of object from the plurality of types of objects and set a reference line based on a direction of the selected type of object; and estimate an angle which is formed by the reference line and a traveling direction line of the vehicle as a direction of the vehicle relative to a lane in which the vehicle is traveling or is scheduled to travel.

While the invention has been described with reference to embodiments, the invention is not limited to the embodiments and can be subjected to various modifications and substitutions without departing from the gist of the invention.

What is claimed is:

1. A vehicle control device comprising:
a memory configured to store instructions; and
a processor configured to execute the instructions to:
acquire an image obtained by imaging a space outside of a vehicle;
detect, through image processing, a plurality of types of objects including a road structure and a moving object shown in the image;
select one type of object from among the detected plurality of types of objects based on a predetermined priority and the detected plurality of types of objects including at least one of a three-dimensional road structure and another vehicle in an adjacent lane;
set a reference line based on a direction of the selected type of object; and
estimate an angle which is formed by the reference line and a traveling direction line of the vehicle as a direction of the vehicle relative to a lane in which the vehicle is traveling or is scheduled to travel.

2. The vehicle control device according to claim 1, wherein, when the selected type of object is the road structure, the direction of the selected type of object is an extending direction of the road structure, or when the selected type of object is the moving object, the direction of the selected type of object is a traveling direction of the moving object.

3. The vehicle control device according to claim 1, wherein, in the predetermined priority, a boundary line of the lane in which the vehicle is traveling or is scheduled to travel has the highest priority, a boundary line of an adjacent lane of the lane has the second highest priority, and another vehicle near the vehicle has the third highest priority.

4. The vehicle control device according to claim 1, further comprising a driving controller configured to generate a target trajectory based on the direction of the vehicle estimated by the vehicle direction estimator and to control steering and acceleration/deceleration of the vehicle regardless of operation of a driver of the vehicle such that the vehicle travels along the generated target trajectory.

5. A vehicle control method which is performed by a computer mounted on a vehicle, the vehicle control method comprising:
acquiring an image obtained by imaging a space outside of a vehicle;
detecting, through image processing, a plurality of types of objects including a road structure and a moving object shown in the image;
selecting one type of object from among the detected plurality of types of objects based on a predetermined priority and the detected plurality of types of objects including at least one of a three-dimensional road structure and another vehicle in an adjacent lane;
setting a reference line based on a direction of the selected type of object; and
estimating an angle which is formed by the reference line and a traveling direction line of the vehicle as a direction of the vehicle relative to a lane in which the vehicle is traveling or is scheduled to travel.

6. A computer-readable non-transitory storage medium storing a program for causing a computer mounted on a vehicle to:
acquire an image obtained by imaging a space outside of a vehicle;
detect, through image processing, a plurality of types of objects including a road structure and a moving object shown in the image;
select one type of object from among the detected plurality of types of objects based on a predetermined priority and the detected plurality of types of objects including at least one of a three-dimensional road structure and another vehicle in an adjacent lane;
set a reference line based on a direction of the selected type of object; and
estimate an angle which is formed by the reference line and a traveling direction line of the vehicle as a direction of the vehicle relative to a lane in which the vehicle is traveling or is scheduled to travel.

7. The vehicle control device according to claim 1, wherein the three-dimensional road structure is at least one of edges of roadsides, curbstones, medians, guard rails, and walls.

8. The vehicle control device according to claim 1,
wherein the processor selects one type of object from among the detected plurality of types of objects based on a predetermined priority set for the three-dimensional road structure and another vehicle in an adjacent lane, and
wherein the processor estimates the direction of the vehicle relative to a lane in which the vehicle is traveling or is scheduled to travel when the vehicle changes lanes to the adjacent lane.

* * * * *